United States Patent [19]
Urano et al.

[11] Patent Number: 5,973,094
[45] Date of Patent: Oct. 26, 1999

[54] FUNCTIONAL POLYMERS

[75] Inventors: Fumiyoshi Urano; Motoshige Sumino; Tsuneaki Maesawa, all of Saitama, Japan

[73] Assignee: Wako Pure Chemical Industries, Ltd., Osaka, Japan

[21] Appl. No.: 08/811,215

[22] Filed: Mar. 5, 1997

[30]  Foreign Application Priority Data

Mar. 7, 1996 [JP] Japan ................................... 8-079584

[51] Int. Cl.⁶ .................................................... C08F 18/00
[52] U.S. Cl. .............................................................. 526/320
[58] Field of Search ............................................. 526/320

[56]  References Cited

U.S. PATENT DOCUMENTS

| | | |
|---|---|---|
| 2,559,635 | 7/1951 | Kenyon et al. .................... 260/85.5 |
| 3,914,333 | 10/1975 | Labana et al. . |
| 3,976,715 | 8/1976 | Labana et al. . |
| 3,976,716 | 8/1976 | Labana et al. . |
| 3,976,717 | 8/1976 | Labana et al. . |
| 3,976,718 | 8/1976 | Labana et al. . |
| 3,976,719 | 8/1976 | Labana et al. . |
| 5,410,005 | 4/1995 | Nemoto et al. . |

FOREIGN PATENT DOCUMENTS 6-294980  10/1994  Japan .
6-324201  11/1994  Japan .

OTHER PUBLICATIONS

"Silver halide photographic materials" JP60125838 85, 07, 05 , Konishiroku Photo–in–house computer abstracts pp. 1–3.

Primary Examiner—Jeffrey T. Smith
Assistant Examiner—N. Sarofim
Attorney, Agent, or Firm—Armstrong, Westerman, Hattori, McLeland & Naughton

[57]  ABSTRACT

To provide a polymer comprising as a structural unit a monomer unit containing a hydroxy group or other hydrophilic radical and other functional group in the molecule which is useful in medical, cosmetic and electric industries.

A polymer comprising as a structural unit a monomer unit shown by the general formfula [1]

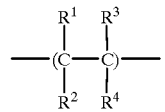

[1]

(wherein $R^1$ and $R^2$ are, independently, a hydrogen atom or a halogen atom, $R^3$ is a hydrophilic radical and $R^4$ is a cyano group or a carboxyl group which may he esterified).

3 Claims, No Drawings

FUNCTIONAL POLYMERS

BACKGROUND INVENTION

The present invention relates to a polymer containing, as a monomer unit, acrylic acid, acrylic acid ester, acrylamide, acrylonitrile and the like to whose carbon atom at α-position is introduced a hydrophilic radical. Particularly, the present invention relates to a functional polymer containing, as a monomer unit, 2-hydroxy acrylic acid, 2-hydroxy acrylic acid ester, 2-hydroxy acrylonitrile, and the like which are useful as functional polymers in medical, cosmetic and electronic industrial chemical fields.

Polymers comprising acrylic acid, methacrylic acid or their esters as a monomer unit have been well known and many of those polymers have been practically utilized as water-absorbing polymers, polymers for chemical fibers, polymers for electron beams type resists, etc. Further, polymers having α-acyloxy acrylic acid ester as a monomer unit has been reported ( for instance, U.S. Pat. No. 2,559,635). Still further, polymers containing, acrylic acid ester as a monomer unit, to whose carbon atom at α-position is bound an acyl group, an alkoxy group, an alkylthio group, etc. have been reported (for instance, Japanese Patent Publication-Kokai-Nos.324201/1994, 294980/1994, etc.). However, those polymers do not satisfy such requirements on functions as water-holding ability, water-absorbing ability, adhesive force to semi-conductor substrate, heat resistance, etc.

Polymers comprising acrylic acid, methacrylic acid or their esters as a monomer unit have been practically utilized in many fields of technologies. In those polymers, carboxyl groups or esterified carboxy groups pending on the main chain show the functionality. However, recently, it has strongly been desired in medical, cosmetic and electronic industrial chemical fields that highly functional polymers having improved water-holding ability, water-absorbing ability, adhesive force to semi-conductor substrate and heat resistance are to be developed.

SUMMARY OF THE INVENTION

The problems to be solved by the present invention is, in consideration of the circumstances mentioned above, to provide polymer having improved water-holding ability, water-absorbing ability, adhesive force to semi-conductor substrate and heat resistance which are useful in medical, cosmetic and electronic industrial fields.

The present invention has been established in order to solve the problems mentioned above and comprises the following:

(1) A polymer comprising, as the structural component, a monomer unit shown by the general formula [1]

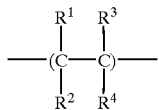

[1]

(wherein $R^1$ and $R^2$ are, independently, a hydrogen atom or a halogen atom, $R^3$ is a hydrophilic radical and $R^4$ is a cyano group, a aminocarbonyl group which may be substituted, or a carboxyl group which may be esterified).

DESCRIPTION OF THE PREFERRED EMBODIMENTS

The halogen atom shown by $R^1$ and $R^2$ in the general formula [1] includes chlorine, bromine, fluorine and iodine, among which fluorine is preferable.

The hydrophilic radical shown by $R^3$ includes, for example, a hydroxy group, a carboxyl group, a lower carboxyalkyloxy group, a lower sulfoalkyloxy group, a hydroxy lower sulfoalkyloxy group, a sulfonic acid group, a lower hydroxyalkyl group, a lower hydroxyalkyloxy group, etc., among which a hydroxy group is preferable.

The lower alkyl group in the lower carboxyalkyloxy group, the lower sulfoalkyloxy group, the hydroxy lower sulfoalkyloxy group, the lower alkylamino group, the lower hydroxyalkyl group and the lower hydroxyalkyloxy group may be any of straight chained, branched or cyclic ones, and preferably those having 1 to 4 carbon atoms, including specifically a methyl group, a ethyl group, a n-propyl group, an isopropyl group, a cyclopropyl group, a n-butyl group, an isobutyl group, a tert-butyl group and a sec-butyl group.

The aminocarbonyl group which may be substituted showm by $R^4$ includes, for example, a carbamoyl group, a N-methylaminocarbonyl group, a N,N-dimethylaminocarbonyl group, a N-ethylaminocarbonyl group, a N,N-diethylaminocarbonyl group, a N-n-propylaminocarbonyl group, a N,N-di-n-propylaminocarbonyl group, a N,N-diisopropylaminocarbonyl group, a N,N-diisopropylaminocarbonyl group, a N-2-hydroxyethylaminocarbonyl group, a N,N-bis(2-hydroxyethyl)aminocarbonyl group, a N-(2-methoxyethyl)arninocarbonyl group, a N,N-bis(2-methoxyethyl)aminocarbonyl group, a N-(2-ethoxyethyl)aminocarbonyl group, a N,N-bis(2-ethoxyethyl)aminocarbonyl group, a N-2-aminoethylaminocarbonyl group, a N,N-bis(2-aminoethyl)aminocarbonyl group, a N-(2-methylaminoethyl)aminocarbonyl group, a N,N-bis(2-methylaminoethyl)aminocarbonyl group, a N,N-bis(2-dimethylaminoethyl)aminocarbonyl group, a N-(2-dimethylaminoethyl)aminocarbonyl group, a N-(2-ethylaminoethyl)aminocarbonyl group, a N,N-bis(2-ethylaminoethyl)aminocarbonyl group, a N,N-bis(2-diethylaminoethyl)aminocarbonyl group, a morpholinocarbonyl group, a piperidinocarbonyl group and a piperazinocarbonyl group.

The carboxyl group which may be esterified shown by $R^4$ is shown by the formula of —COOR and R is a hydrogen atom or an alkyl group which may have one or more substituents as shown by $R^5$.

The alkyl group which may have one or more substituents shown by $R^5$ may be any of straight chained, branched or cyclic ones, and the cyclic ones may have one or more hetero atom such as N, S and O, and the number of the hetero atom is preferably 1 to 2. The straight or branched alkyl is preferably one having 1 to 12 carbon atoms, including specifically a methyl group, a ethyl group, a n-propyl group, an isopropyl group, a n-butyl group, an isobutyl group, a tert-butyl group, a sec-butyl group, a n-pentyl group, an isopentyl group, a tert-pentyl group, a 1-methylpentyl group, a n-hexyl group, an isohexyl group, a heptyl group, an octyl group, a nonyl group, a decyl group, an undecyl group, a dodecyl group, etc. The cyclic alkyl group is preferably one having 3 to 12 carbon atoms, including specifically a cyclopropyl group, a cyclopentyl group, a cyclohexyl group, a tricyclodecanyl group, a dicyclopentenyl group, a norbornyl group, a norboman epoxy group, an adamantyl group, a 2-methyl-2-adamantyl group, a tetrahydropyranyl group, a menthyl group, etc., among which those having 7 to 12 carbon atoms such as a tricyclodecanyl group, a dicyclopentenyl group, a norbornyl group, a norbornan epoxy group, an adamantyl group and a 2-methyl-2-adamantyl group are exemplified as more preferable embodiments.

The substituent in the alkyl group shown by $R^5$ includes a halogen atom such as chlorine, bromine, fluorine and iodine, a hydroxy group, a oxo group, an alkoxy group, a haloalkoxy group and an aralkyloxy group. The alkoxy group and one in the haloalkoxy group may be any of straight chained or branched ones and those having 1 to 8 carbon atoms are preferable, including specifically a methoxy group, an ethoxy group, a n-propoxy group, an isopropoxy group, a n-butoxy group, an isobutoxy group, a tert-butoxy group, a sec-butoxy group, a n-pentyloxy group, an isopentyloxy group, a n-hexyloxy group, an iso-hexyloxy group, a n-heptyloxy group, an isoheptyloxy group, a n-octyloxy group, an isooctyloxy group, etc. The halogen atom in the haloalkoxy group includes chlorine, bromine, fluorine and iodine. The aralkyl group in the aralkyoxy group includes a benzyl group, a phenethyl group, a phenylpropyl group, a inethylbenzyl group, a methyl phenethyl group, an ethylbcnzyl group, etc.

The preferable examples of those alkyl group having substituent are a chloroalkyl group, a bromoalkyl group, a iluoroalkyl group, an iodoalkyl group, a hydroxyalkyl group, a dihydroxyalkyl group, 3-oxocyclohexyl group, 4-(2-oxo-4-methyl)tetrahydropyranyl group, an alkoxyalkyl group, a haloalkoxyalkyl group, an aralkyloxyalkyl group, etc, among which a fluoroalkyl group is more preferable.

Namely, the polymer comprising the monomer unit shown by the general formula [1], wherein $R^4$ is carboxyl group esterified with a fluoroalkyl group is useful as a binder for over-coating film which is used for preventing an influence of standing waves in a process of lithography.

The most characteristic feature of the polymer of the present invention lics in that the polymer contains, as a monomer unit, a monomer to whose carbon atom at α-position is bound a hydrophilic radical such as a hydroxy group, a carboxyl group, a lower carboxyalkyloxy group, a lower sulfoalkyloxy group, a hydroxy lower sulfoalkyloxy group, a sulfonic acid group, a lower hydroxyalkyl group, a lower hydroxyalkyloxy group, etc.

The polymer of the present invention, which comprises, as the structural component, a monomer unit shown by the general formula [1] is remarkably improved in its water-holding ability, water-absorbing ability, water solubility, heat resistance, etc. because of the hydrophilic radical contained in its molecule, as compared with known polymers Additionally, when the polymer is used as a resist material for semi-conductor devices, high adhesiveness to a substrate is attained. Further, the polymer containing fluorine atoms in the molecule, among the polymers of the present invention, are improved in heat resistance and it can much advantageously be used as an over-coating film material in production of ones derived from semi-conductor devices because refractive index, etc are improved.

The monomer unit shown by the general formula [1] is one derived from the monomer shown by the general formula [1a].

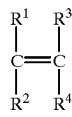

[1a]

Typical examples of the monomer shown by the above general formula [1a] are 2-hydroxyacrylic acid, 2-sulfoacrylic acid, 2-carboxy acrylic acid, 2-(2-hydroxyethoxy)acrylic acid, 2-(2,3-dihydroxypropoxy) acrylic acid, 2-hydroxyacrylonitrile, 2-hydroxyacrylamide, N,N-dimethyl 2-hydroxyacrylamide, N-methyl 2-hydroxyacrylamide, N-ethyl 2-hydroxyacrylamide, N,N-bis(2-hydroxyethyl) 2-hydroxyacrylamide, piperidino 2-hydroxyacrylamide, N,N-dimethyl 2-hydroxyacrylamide, 2-hydroxymethylacrylamide,piperidino 2-hydroxymethylacrylamide, 3,3-difluoro-2-hydroxyacrylic acid, 3-monofluoro-2-hydroxyacrylic acid, methyl 2-hydroxyacrylate, ethyl 2-hydroxyacrylate, n-propyl 2-hydroxyacrylate, isopropyl 2-hydroxyacrylate, sec-butyl 2-hydroxyacrylate, isobutyl 2-hydroxyacrylate, tert-butyl 2-hydroxyacrylate, n-pentyl 2-hydroxyacrylate, isoamyl 2-hydroxyacrylate, n-hexyl 2-hydroxyacrylate, cyclohexyl 2-hydroxyacrylate, octyl 2-hydroxyacrylate, 1-methylcyclohexyl 2-hydroxyacrylate, 2-hydroxyethyl 2-hydroxyacrylate, 2,3-dihydroxypropyl 2-hydroxyacrylate, 4-hydroxybutyl 2-hydroxyacrylate, 2,2,2-trifluoroethyl 2-hydroxyacrylate, 3,3,3-trifluoropropyl 2-hydroxyacrylate, 3,3,4,4,4-pentafluorobutyl 2-hydroxyacrylate, perfluoroethyl 2-hydroxyacrylate, perfluorobutyl 2-hydroxyacrylate, 3-oxocyclohexyl 2-hydroxyacrylate, 4-(2-oxo-4-methyl) tetrahydropyranyl 2-hydroxyacrylate, tricyclodecanyl 2-hydroxyacrylate, dicyclopentenyl 2-hydroxyacrylate, norbornyl 2-hydroxyacrylate, norboman epoxy 2-hydroxyacrylate, adamantyl 2-hydroxyacrylate, 2-methyl-2-adamantyl 2-hydroxyacrylate, 1-methoxyethyl 2-hydroxyacrylate, 1-ethoxyethyl 2-hydroxyacrylate, 1-isopropoxyethyl 2-hydroxyacrylate, 1-benzyloxyethyl 2-hydroxyacrylate, 1-butoxyethyl 2-hydroxyacrylate, 1-(2-chloroethoxy)ethyl 2-hydroxyacrylate, 1-methoxy-1-methylethyl 2-hydroxyacrylate, tetrahydropyranyl 2-hydroxyacrylate, tetrahydrofuranyl 2-hydroxyacrylate, 2-hydroxymethylacrylic acid, 2-(2,3-dihydroxypropoxy) acrylic acid, menthyl 2-hydroxyacrylate, etc.

The polymer comprising, as a structural component, a monomer unit shown by the general formula [1] includes homopolymers containing one kind of the monomer unit in the present invention, copolymers containing two or more kinds of the monomer units in the present invention and copolymers containing one or more kinds of the monomer units in the present invention and one or more kinds of other monomer unit. The said other monomer unit may be any monomer units of copolymerizable monomers, including ones derived from ethylene type monomers having 2 to 15 carbon atoms such as acrylonitrile, methacrylonitrile, vinyl alcohol and styrene type monomers such as styrene, p-methyl-styrene, p-hydroxystyrene, p-tert-butoxystyrene, p-tert-butoxycarbonyloxystyrene and p-1-ethoxyethoxystyrene, α, β-ethylenically unsaturated carboxylic acids having 3 to 20 carbon such as methacrylic acid, acrylic acid, itaconic acid, maleic acid, fumaric acid and crotonic acid, α, β-ethylenically unsaturated carboxylic acid esters having 4 to 20 carbon atoms such as methyl methacrylate, ethyl methacrylate, propyl methacrylate, butyl methacrylate, 2-ethylhexyl methacrylate, 2,2,2-trifluoroethylmethacrylate, 3,3,3-trifluoropropyl methacrylate, 3,3,4,4,4-pentafluorobutyl methacrylate, tricyclodecanyl methacrylate, adamantyl methacrylate, 2-methyl-2-adamantyl methacrylate, 2-methoxyethyl methacrylate, 2-ethoyethyl methacrylate, 2-isopropoxyethyl methacrylate, 1-methoxy-1-methylethyl methacrylate, 1-benzyloxyethyl methacrylate, 1-(2-chloroethoxy)ethyl methacrylate, stearyl methacrylate, methyl acrylate, ethyl acrylate, butyl acrylate, 2-ethylhexyl acrylate, lauryl methacrylate, stearyl acrylate, methyl itaconate, ethyl itaconate, methyl maleate, ethyl maleate, methy fumarate, ethyl fumarate, methyl crotonate and ethyl crotonate, among which those shown by the following general formula [20] are preferable;

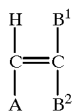

[20]

(wherein A and $B^1$ are, independently, a hydrogen atom or a lower alkyl group having 1 to 5 carbon atoms, and $B^2$ is a carboxyl group, a cyano group, a aminocarbonyl group, an alkyl group which may have substituents, a alkyl oxycarbonyl group which may have substituents or aryl group which may have substituents).

In the formula [20], the alkyl group in the definition of A and $B^1$ includes either straight chained, branched or cyclic alkyl groups preferably having 1 to 5 carbon atoms, for example, a methyl group, an ethyl group, a n-propyl group, an isopropyl group, a cyclopropyl group, a n-butyl group, an isobutyl group, a tert-butyl group, a sec-butyl group, a n-pentyl group, an isopentyl group, a tert-pentyl group, a 1-methylpentyl group, a cyclopentyl group, etc.

The alkyl group which may be substituted in the definition of $B^2$, there can he used a straight chained, branched or cyclic alkyl groups preferably having 1 to 15 carbon atoms, for example, a methyl group, an ethyl group, a n-propyl group, an isopropyl group, a cyclopropyl group, a n-butyl group, an isobutyl group, a tert-butyl group, a sec-butyl group, a n-pentyl group, an isopentyl group, a tert-pentyl group, a 1-methylpentyl group, a cyclopentyl group, a n-hexyl group, an isohexyl group, a cyclohexyl group, a heptyl group, an octyl group, a nonyl group, a decyl group, a undecyl group, a dodccyl group, a tridecyl group, tetradecyl group, a pentadecyl group, a tricyclodecanyl group, a dicyclopentenyl group, a norbomyl group, a norboman epoxy group, an adamantyl group and a 2-methyl-2-adamantyl group, etc.

The substituent for the alkyl group in the definition of $B^2$ includes a halogen atom such as chlorine, bromine, fluorine and iodine, an alkoxy group such as a methoxy group, an ethoxy group, a n-propoxy group, an isopropoxy group, a n-butoxy group, an isobutoxy group, a tert-butoxy group, a sec-butoxy group, a n-pentyloxy group, an isopentyloxy group, a n-hexyloxy group, an iso-hexyloxy group, a n-heptyloxy group, an isoheptyloxy group, a n-octyloxy group, and an isooctyloxy group or aralkyloxy group such as benzyloxy group and phenethyloxy group.

The alkyl moiety in the alkyl oxycarbonyl group in the definition of $B^2$ includes straight chained, branched or cyclic alkyl groups preferably having 1 to 15 carbon atoms, for example, a methyl group, an ethyl group, a n-propyl group, an isopropyl group, a cyclopropyl group, a n-butyl group, an isobutyl group, a tert-butyl group, a sec-butyl group, a n-pentyl group, an isopentyl group, a tert-pentyl group, a 1-methylpentyl group, a cyclopentyl group, a n-hexyl group, an isohexyl group, a cyclohexyl group, a heptyl group, an octyl group, a nonyl group, a decyl group, a undecyl group, a dodecyl group, a tridecyl group, tetradecyl group, a pentadecyl group, a tricyclodecanyl group, a dicyclopentenyl group, a norbormyl group, a norbornan epoxy group, an adamantyl group and a 2-methyl-2-adamantyl group, etc.

The substituent for the alkyl moiety in alkyl oxycarbonyl group in the definition of $B^2$ includes a halogen atom such as chlorine, bromine, fluorine and iodine, an alkoxy group such as a methoxy group, an ethoxy group, a n-propoxy group, an isopropoxy group, a n-butoxy group, an isobutoxy group, a tert-butoxy group, a sec-butoxy group, a n-pentyloxy group, an isopentyloxy group, a n-hexyloxy group, an iso-hexyloxy group, a n-heptyloxy group, an isoheptyloxy group, a n-octyloxy group, and an isooctyloxy group or aralkyloxy group such as benzyloxy group and phenethyloxy group.

The aryl group which may be substituted in the definition of $B^2$, there can be used a phenyl group, a tolyl group, a naphthyl group, etc.

The substituent for the aryl group in the definition of $B^2$ includes a halogen atom such as chlorine, bromine, fluorine and iodine, an alkyl group such as a methyl group, an ethyl group, a n-propyl group, an isopropyl group, a cyclopropyl group, a n-butyl group, an isobutyl group, a tert-butyl group, a sec-butyl group, a n-pentyl group, an isopentyl group, a tert-pentyl group, a 1-methylpentyl group, a cyclopentyl group, a n-hexyl group, an isohexyl group, a cyclohexyl group, an alkoxy group such as a methoxy group, an ethoxy group, a n-propoxy group, an isopropoxy group, a n-butoxy group, an isobutoxy group, a tert-butoxy group, a sec-butoxy group, a n-pentyloxy group, an isopentyloxy group, a n-hexyloxy group, an iso-hexyloxy group, a n-heptyloxy group, an isoheptyloxy group, a n-octyloxy group, and an isooctyloxy group.

When the above monomer is used together with the monomer unit in the present invention, the resulting copolymer has the monomer unit(s) shown by the general formula [1] and a monomer unit(s) shown by the general formula [21]

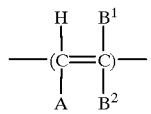

[21]

wherein the symbols have the same meaning as above.

Examples of the polymers of the present invention are poly(2-hydroxyacrylic acid), poly(2-sulfoacrylic acid), poly(2-carboxyacrylic acid), poly[2-(2-hydroxyethoxy) acrylic acid], poly[2-(2,3-dihydroxypropoxy)acrylic acid], poly(2-hydroxyacrylonitrile), poly(2-hydroxy acrylamide), poly(N,N-dimethyl-2-hydroxy acrylamide), poly(N,N-dimethyl-2-hydroxy acrylamide), poly(2-hydroxymethyl acrylamide), poly(piperidino-2-hydroxy acrylamide), poly(N,N-dimethyl2-hydroxy acrylamide), poly(3,3-difluoro-2-hydroxyacrylic acid), poly(3-fluoro-2-hydroxyacrylic acid), poly(2-hydroxyacrylic acid/acrylic acid), poly(2-hydroxyacrylic acid/methacrylic acid), poly(2-hydroxyacrylic acid/vinyl alcohol), poly(2-hydroxyacrylic acid/2,2,2-trifluoroethyl methacrylate), poly(2-hydroxyacrylic acid/3,3,3-trifluoropropyl methacrylate), poly(2-hydroxyacrylic acid/3,3,4,4,4-pentafluorobutyl methacrylate), poly(2-hydroxyethyl 2-hydroxyacrylate), poly(2,3-dihydroxypropyl 2-hydroxyacrylate), poly(4-hydroxybutyl 2-hydroxyacrylate), poly(perfluoroethyl 2-hydroxyacrylate/acrylic acid), poly(perfluorobutyl 2-hydroxyacrylate/methacrylic acid), poly(methyl 2-hydroxyacrylate), poly(methyl 2-hydroxyacrylate/acrylic acid), poly(ethyl 2-hydroxyacrylate), poly(n-propyl 2-hydroxyacrylate), poly(isopropyl 2-hydroxyacrylate), poly(sec-butyl 2-hydroxyacrylate), poly(isobutyl 2-hydroxyacrylate), poly(tert-butyl 2-hydroxyacrylate), poly(n-pentyl 2-hydroxyacrylate), poly(isoamyl 2-hydroxyacrylate), poly(n-hexyl 2-hydroxyacrylate), poly(cyclohexyl 2-hydroxyacrylate), poly(octyl 2-hydroxyacrylate), poly(1-methoxyethyl 2-hydroxyacrylate), poly(1-ethoxyethyl 2-hydroxyacrylate), poly(1-methoxy-1-methylethyl 2-hydroxya crylate), poly(1-methylcyclohexyl 2-hydroxyacrylate/tricyclodecanyl methacrylate), poly(1-methylcyclohexyl 2-hydroxyacrylate/adamantyl methacrylate), poly(3-oxocyclohexyl 2-hydroxyacrylate/adamantyl methacrylate), poly[4-(2-oxo-4-methyl)tetrahydropyranyl 2-hydroxyacrylate/2-methyl-2-adamantyl methacrylate], poly(tetrahydropyranyl 2-hydroxyacrylate/adamantyl methacrylate), poly(tetrahydrofuranyl 2-hydroxyacrylate/2-methyl-2-adamantyl methacrylate), poly(tricyclodecanyl-hydroxyacrylate/1-methoxyethyl methacrylate), poly(tricyclodecanyl 2-hydroxyacrylate/1-ethoxyethyl methacryalte), poly(menthyl 2-hydroxyacrylate/methyl methacryalte), poly(tricyclodecanyl 2-hydroxyacrylate/1-isopropoxyethyl methacrylate), poly(tricyclodecanyl 2-hydroxyacrylate/1-benzyloxyethyl methacrylate), poly(tricyclodecanyl 2-hydroxyacrylate/1-methoxy-1-methylethyl methacrylate), poly(dicyclopentenyl 2-hydroxyacrylate/1-methoxyethyl methacrylate), poly(dicyclopentenyl 2-hydroxyacrylate/1-ethoxyethyl methacrylate), poly(dicyclopentenyl 2-hydroxyacrylate/1-methoxy-1-methylethyl methacrylate), poly(norbornyl 2-hydroxyacrylate/1-ethoxyethyl methacrylate), poly(norbornyl 2-hydroxyacrylate/1-methoxyethyl methacrylate), poly(norbornyl 2-hydroxyacrylate/1-(2-chloroethoxy)ethyl methacrylate), poly(norboman epoxy 2-hydroxyacrylate/1-ethloxyethyl metharyltate), poly( norboman epoxy 2-hydroxyacrylate/1-methoxy-1-methylethy methacrylate), poly(adamantyl 2-hydroxyacrylate/tert-butyl methacrylate), poly(adamantyl 2-hydroxyacrylate/1-methoxyethyl methacrylate), poly(adamantyl 2-hydroxyacrylate/1-ethoxyethyl methacrylate), poly(adamantyl 2-hydroxyacrylate/1-methoxy-1-methylethyl methacrylate), poly(1-methoxyethyl 2-hydroxyacrylate/tricyclodecanyl methacrylate), poly(1-methoxyethyl 2-hydroxyacrylate/acrylonitrile), poly(1-methoxyethyl 2-hydroxyacrylate/adamantyl methacrylate), poly(1-ethoxyethyl 2-hydroxyacrylate/adamantyl methaerylate), poly (2-methyl-2-adamantyl 2-hydroxyacrylate/tert-butyl methacrylate), poly(2-methyl-2-adamantyl 2-hydroxyacrylate/1-ethoxyethyl methacrylate), poly(2-methyl-2-adamantyl 2-hydroxyacrylate/1-methoxy-1-methylethyl methacrylate), poly(N,N-dimethyl2-hydroxymethylacrylamide/2-hydroxyacrylic acid), poly(2-hydroxymethyl acrylamide/tricyclodecanyl 2-hydroxyacrylate), poly(2-hydroxyacrylamide/adamantyl 2-hydroxyacrylate), poly(N,N-dimethyl2-hydroxy acrylamide/tricyclodecanyl 2-hydroxymethylacrylate), poly (1-ethoxyethyl 2-hydroxyacrylate/tricyclodecanyl methacrylate), poly(1-ethoxyethyl 2-hydroxyacrylate/acrylonitrile), poly(1-isopropoxyethyl 2-hydroxyacrylate/tricyclodecanyl methacrylate), poly(1-benzyloxyethyl 2-hydroxyacrylate/tricyclodecanyl methacrylate), poly(1-butoxyethyl 2-hydroxyacrylate/adamantyl methacrylate), poly[1-(2-chloroethoxy)ethyl 2-hydroxyacrylate/adamantyl methacrylate], poly(1-methoxy-1-methylethyl 2-hydroxyacrylate/tricyclodecanyl methacrylate), poly (tetrahydropyranyl 2-hydroxyacrylate/tricyclodecanyl methacrylate), poly(tetrahydrofuranyl 2-hydroxyacrylate/adamantyl methacrylate), poly(2-hydroxyacrylic acid/2,2,2-trifluoroethyl 2-hydroxyacrylate), poly(2-hydroxyacrylic acid/3,3,3-trifluoropropyl 2-hydroxyacrylate), poly(2-hydroxyacrylic acid/3,3,4,4,4-pentaluorobutyl 2-hydroxyacrylate), poly(2-hydroxyacrylic acid/perfluorobutyl 2-hydroxyacrylate), poly(2-hydroxyacrylic acid/tricyclodecanyl 2-hydroxyacrylate), poly(2-hydroxyacrylic acid/adamantyl 2-hydroxyacrylate), poly (menthyl 2-hydroxyacrylate/methyl methacrylate), poly(2-hydroxyacrylic acid/menthyl 2-hydroxyacrylate), poly(2-hydroxyacrylic acid/2-hydroxyacrylamide), poly(2-hydroxyacrylic acid/N,N-dimethyl 2-hydroxyacrylamide), poly(2-hydroxyacrylic acid/p-hydroxystyrene), poly(2-hydroxyacrylic acid/p-1-ethoxyethoxystyrene), poly(2-hydroxyacrylic acid/styrene), poly(2-hydroxyacrylic acid/p-tert-butoxycarbonyloxystyrene), poly(2-hydroxyacrylic acid/p-tert-butoxystyrene), cross-linked copolymer of 2-hydroxyacrylic acid cross-linked by methylene bisacrylamide, copolymer of 2-aminoacrylic acid cross-linked by methylene bisacrylamide, copolymer of 2-hydroxyacrylic acid cross-linked by bisphenol A, etc.

The polymer comprising, as a structural component, a monomer unit shown by the general formula [1], wherein the hydrophilic radical shown by $R^3$ in the general formula [1] is a hydroxy group, for instance, is synthesized using, as a starting material, a monomer whose hydroxy group is protected with a protecting group, which is obtained by any of the following methods (a) to (d).

Method (a):

A compound shown by the following general formula [3]

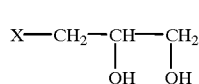

[3]

(wherein X is a halogen atom such as chlorine, bromine, fluorine and iodine) is subjected to a reaction in sulfuric acid. acetic acid or an aqueous solution thereof in the presence of an oxidizing agent such as nitric acid, platinum oxide/oxygen, chromium trioxide, potassium permanganate and chromic acid at 0 to 120° C. for 0.5 to 20 hours with stirring, and the reaction solution is poured into water, followed by after-treatment to give α-hydroxycarboxylic acid compound shown by the general formula [4]

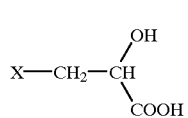

[4]

(wherein X has the same meaning as above). The α-hydroxycarboxylic acid compound is reacted with a lower alcohol such as methanol, ethanol, iso-propanol, n-propanol, n-butanol, sec-butanol and tert-butanol(the alcohol corresponding to $R^9$ of the following general formula [5]) and an acid [for instance, an inorganic acid such as sulfuric acid, phosphoric acid, hydrochloric acid and hydrobromic acid and other Lewis acids and an organic acid such as p-toluene sulfonic acid, malonic acid and oxalic acid are preferable] at 30 to 110° C. for 1 to 20 hours to esterify the compound, and after the reaction, the resultant is subjected to conventional after-treatment to give α-hydroxycarboxylic acid ester compound shown by the general formula [5]

[5]

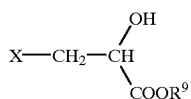

(wherein X has the same meaning as above and $R^9$ is an alkyl group corresponding to the above alcohol). Then, the α-hydroxycarboxylic acid ester is reacted with a lower aliphatic or an aromatic carboxylic acid anhydride such as acetic anhydride, propionic anhydride and benzoic anhydride. (a compound containing the lower alkyl group or aryl group corresponding to $R^{10}$ in the following general formula [6]) at 20 to 120° C. for 0.5 to 20 hours, followed by treating the reaction solution after a conventional manner to give a diester compound shown by the following general formula [6]

[6]

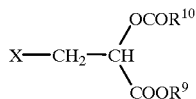

(wherein $R^{10}$ is a lower alkyl group or an aryl group corresponding to the above acid, and $R^9$ and X have the same meaning as above). Further this diester is subjected to a reaction in the presence of an organic base [for instance, triethylamine, pyridine, γ-collidine, piperidine, etc. are preferable] in an organic solvent [for instance, benzene, toluene, cyclohexane, n-hexane, ethyl ether, methylene chloride, etc. are preferable] at 0 to 120° C. for 0.5 to 20 hours, followed by treating the reaction solution after a conventional manner to recover the object monomer shown by the general formula [7]

[7]

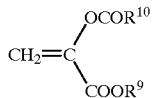

(wherein $R^9$ and $R^{10}$ have the same meaning as above).

Method (b):

A pyruvic acid ester or a fluorinated pyruvic acid ester shown by the following general formula [8]

[8]

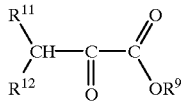

(wherein $R^9$ has the same meaning as above and $R^{11}$ and $R^{12}$ are independently a hydrogen atom or a fluorine atom) is reacted with a lower aliphatic carboxylic or an aromatic carboxylic acid anhydride such as acetic anhydride, propionic anhydride and benzoic anhydride or the corespondding acid halide such as acetyl chloride, acetyl bromide, propanoyl chloride and benzoyl chloride(a compound containing an alkyl group or an aryl group corresponding to the $R^{10}$ in the following general formula [9]) in the absence of a catalyst or in the presence of a catalytic amount of pyridinium p-toluene sulfonate, etc. in the presence of an organic base [for instance, triethylamine, diethylamine, pyridine, piperidine and γ-collidine are preferable] in a suitable solvent [for instance, organic solvents such as benzene, toluene, n-hexane, ethyl acetate, acetone, methylethyl ketone, 1,4-dioxane, 1,3-dioxolane and cyclohexane are preferable] at 30 to 150° C. for 1 to 20 hours, and after the reaction, a conventional after-treatment is conducted to recover the object monomer shown by the following general formula [9]

[9]

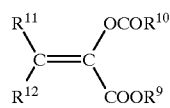

(wherein $R^9$, $R^{10}$, $R^{11}$ and $R^{12}$ have the same meaning as above).

Method (c):

A pyruvic acid shown by the following formula [10]

[10]

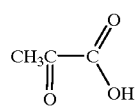

is reacted with an alcohol compound shown by the following general formula [11]

$R^{13}OH$ [11]

[wherein $R^{13}$ is a straight chained, branched or cyclic alkyl group (the cyclic alkyl group may have one or more hetero atom such as N, S and O) which may be substituted, and the said substituent is a halogen atom, a hydroxy group, an oxo group, an alkoxy group, a haloalkoxy group, an aralkyloxy group, etc] in the presence of a dehydrating agent such as dicyclohexylcarbodiimide (DCC) in an organic solvent such as ethyl acetate, methylene chloride, acetone, methylethyl ketone, tetrahydrofuran and ethyl ether at 0 to 120° C. for 0.5 to 20 hours with stirring, followed by conventional after-treatment to give a pyruvic acid ester shown by the following general formula [12]

[12]

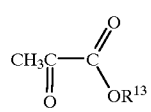

(wherein $R^{13}$ has the same meaning as above).

The pyruvic acid ester shown by the general formula [12] is also obtained by reacting the pyruvic acid shown by the formula [10] with the alcohol compound shown by the general formula [11] in the presence of a catalytic amount of an acid such as sulfuric acid, p-toluene sulfonic acid, phosphoric acid, hydrochloric acid and oxalic acid in the absence or presence of an organic solvent such as benzene, toluene, xylene and cyclohexane at 50 to 150° C. for 0.5 to 20 hours with stirring, followed by conventional after-treatment The pyruvic acid ester shown by the general formula [12] is also obtained by reacting pyruvic acid shown by the formula [10] with an ethenyl compound shown by the following general formula [13]

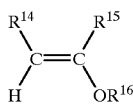

[13]

(wherein $R^{14}$ and $R^{15}$ are independently a hydrogen atom, an alkyl group or a haloalky group and $R^{16}$ is an alkyl group, a haloalkyl group or an aralkyl group, and $R^{14}$ and $R^{15}$ or $R^{15}$ and $R^{16}$ may form together a methylene chain) in the presence of a catalytic amount of an acid or a salt such as sulfuric acid, phosphoric acid, p-toluene sulfonic acid, oxalic acid, and pyridinium p-toluene sulfonate in an organic solvent such as 1,3-dioxolane, 1,4-dioxane, ethyl ether, tetrahydrofuran, acetone, methylethyl ketone, benzene, toluene, methylene chloride and ethyl acetate at 0 to 100° C. for 0.5 to 20 hours with stirring, followed by treating the reaction solution after conventional manner.

Thus obtained pyruvic acid ester shown by the above general formula [12] is reacted with a sillylating agent(a sillylating agent corresponding to $R^{18}$ of the general formula [14])[for instance, a trialkyl sillyl chloride, hexamethyl disilazane, bis-N-(trimethylsillyl) trifluoroacetamide, etc. are preferable] in the presence of an organic base[for instance, triethylamine, pyridine, morpholine, etc. are preferable] in an organic solvent such as ethyl ether, ethyl acetate, benzene, toluene, cyclohexane, n-hexane, acetone and methylene chloride at 0 to 100° C. for 0.5 to 10 hours with stirring, followed by treating the reaction solution after a conventional manner to recover the object monomer shown by the following general formula

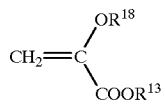

[14]

(wherein $R^{18}$ is an alkyl sillyl group and $R^{13}$ has the same meaning as above).

Method (d):

The pyruvic acid ester shown by the general formula [12] is reacted with a benzyl halide compound(a benzyl halide compound corresponding to $R^{19}$ of the general formula [15])[for instance, p-nitrobenzyl chloride, benzyl chloride, benzyl bromide, etc. are preferable] in the presence of an inorganic base[for instance, sodium hydride, sodium methoxide, potassium methoxide, potassium tert-butoxide, metallic sodium, n-butyl lithium, etc. are preferable] in an organic solvent such as benzene, toluene, xylene, cyclohexane, ethyl ether and tetrahydrofuran at 0 to 100° C. for 0.5 to 10 hours with stirring, followed by treating the reaction solution after a conventional manner to recover the object monomer shown by the following general formula [15]

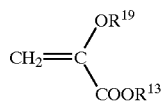

[15]

(wherein $R^{19}$ is benzyl group or a substituted benzyl group and $R^{13}$ has the same meaning as above).

Among the polymers of the present invention, those which comprises as a structural unit a monomer unit shown by the general formula [1] in which the hydrophilic radical shown by $R^3$ is a hydroxy group can easily be obtained by any of the following methods (1) to (4) starting from the monomer, which is obtained the above mentioned methods (a) to (d).

Method-(1)

The monomer shown by the general formula [7] or [9] obtained by the above method (a) or (b) alone or a mixture of the monomer with other monomer, if necessary, in a suitable amount is allowed to conduct any of the following polymerization reactions ① a reaction in the presence of an azo type polymerization initiator such as 2,2'-azobisisobutyronitrile, 2,2'-azobis(2-methylbutyronitrile), 2,2'-azobis(2,4-dimethlylvaleronitrile), 2,2'-azobis(2,4-dimethyl-4-methoxyvaleronitrile) and 2,2'-azobis(methyl 2-methylproionate) or a peroxide type polymerization initiator such as benzoyl peroxide and lauroyl peroxide in a dehydrated organic solvent such as ethyl ether, 1,3-dioxolane, 1,2-dimethoxyethane, ethyl acetate, tetrahydrofuran, toluene, cyclohexane, isopropanol and n-butanol under stream of an inert gas such as nitrogen and argon at 20 to 120 ° C. for 0.5 to 20 hours with stirring, or ② a reaction in the presence of a living anion polymerization initiator such as n-butyl lithium, sec-butyl lithium, tert-butyl lithium, potassium naphthalene and potassium cumyl in dehydrated organic solvent such as ethyl ether, 1,3-dioxolane, 1,2-dimethoxyethane, tetrahydrofuran, ethyl acetate, methylethyl ketone, toluene, and cyclohexane under stream of an inert gas such as nitrogen and argon at −78 to 0° C. for 0.5 to 20 hours with stirring, followed by a conventional after-treatment to obtain a homopolymer or a copolymer comprising as a structural unit a monomer unit shown by the following general formula [16]

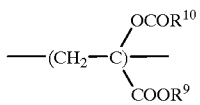

[16]

(wherein $R^9$ and $R^{10}$ have the same meaning as above), or a homopolymer or a copolymer comprising as a structural unit a monomer unit shown by the following general formula [17]

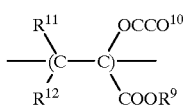

[17]

(wherein $R^9$, $R^{10}$, $R^{11}$ and $R^{12}$ have the same meaning as above). Then, the homopolymer or copolymer comprising as a structural unit the monomer unit shown by the above general formula [16] or [17] is subjected to a reaction in an aqueous solution or an alcholic solution containing an alkali such as sodium hydroxide, potassium hydroxide and tetramethyl ammonium hydroxide at 0 to 100° C. for 0.5 to 20 hours with stirring and the reaction solution is treated after a conventional manner for recovering a polymer compound to recover the polymer of the present invention comprising as a structural unit the monomer unit of the general formula [1] wherein the hydrophilic radical shown by $R^3$ is a hydroxy group.

Method-(2)

The monomer shown by the general formula [14] obtained by the above method (c) alone or a mixture of the monomer with other suitable monomer, if necessary, in a suitable amount is subjected to a radical polymerization reaction or a living anion polymerization reaction after a similar manner to the above method (1), followed by treating after a conventional manner for recovering a polymer to obtain a homopolymer or a copolymer comprising as a structural unit a monomer unit shown by the following general formula [18]

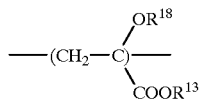

[18]

(wherein $R^{13}$ and $R^{18}$ have the same meaning as above). Then the obtained polymer is stirring in water or alcohol at 0 to 100° C. for 0.5 to 10 hours, followed by treating after a conventional manner for recovering a polymer to recover the polymer of the present invention comprising as a structural unit the object monomer unit.

Method-(3)

The monomer of the general formula [15] obtained by the above method (d) alone or a mixture of the monomer with other suitable monomer, if necessary, in a pre-determined amount is subjected to a radical polymerization reaction or a living anion polymerization reaction after a similar manner to the above method (1), followed by treating after a conventional method for recovering a polymer to obtain a homopolymer or a copolymer comprising as a structural unit a monomer unit shown by the following general formula [19]

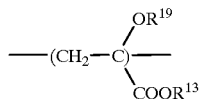

[19]

(wherein $R^{13}$ and $R^{19}$ have the same meaning as above). Then the resulting polymer is subjected to catalytic reduction in the presence of a catalyst such as palladium-carbon and Raney nickel in an organic solvent such as an alcohol, benzene, toluene, cyclohexane, ethyl ether and tetrahydrofuran under normal to elevated pressure at 0 to 100° C. for 0.5 to 20 hours, and the reaction solution is treated after a conventional manner to recover the polymer of the present invention comprising as a structural unit the object monomer unit.

Method-(4)

The poly(2-hydroacrylic acid) obtained by above methods (1), (2) or (3) is reacted with a compound shown by the following formula [22]

$$R^{20}X \quad [22]$$

[wherein $R^{20}$ is a straight chained, branched or cyclic alkyl group (the cyclic alkyl group may have one or more hetero atoms such as N, S and O) which may be substituted, and the said substituent is a halogen atom, a hydroxygroup, a oxo group, an alkoxy group, a haloalkoxy group, an aralkyloxy group, etc. and X is a hydroxy group or a halogen atom] in the present of a dehydrating agent such as dicyclohexylcarbodiimide(DCC) and 1-ethyl-3-(3-dimethylaminopropyl)carbodiimide hydrochloride(WSC), or an acid such as sulfuric acid, phosphoric acid, p-toluenesulfonic acid and oxalic acid in an organic solvent such as benzene, toluene, cyclohexane, acetone, ethyl acetate, methylene chloride, methylethyl ketone, mrthylisobutyl ketone, tetrahydrofuran, ethyl ether, N,N-dimethylformamide and N,N-dimethylacetamide at 0 to 150° C. for 0.5 to 30 hours with stirring, followed by treating after a conventional manner for recovering a polymer to recover the polymer of the present invention comprising as a structural unit the object monomer unit.

The polymer of the present invention comprising as a structural unit the monomer unit shown by the general formula [1] is water soluble and thus useful for preparation of semi-conductor devices, particularly useful as a binder for over-coating film which is used for preventing an effect of standing waves in a process of lithography. Further, the polymer shows high adhesiveness to a semi-conductor substrate by virtue of its hydrophilic radical such as a hydroxy group at a carbon atom at the α-position and shows high transmittancy near 193 nm wave length of ArF excimer laser and thus it is useful also as a binder for an exposure technology using ArF excimer laser of the coming generation.

Further the polymer of the present invention shows high water holding ability and water absorbing ability and thus water-absorbable polymer of high quality can be obtained by subjecting the polymer to a cross-linking reaction with a cross-linking agent such as methylene bisacrylamide.

Preferable examples of the polymer comprising as a structural unit the monomer unit shown by the general formula [1] of the present invention which is useful for an over-coating film material and a resist material are those wherein $R^1$ and $R^2$ are a hydrogen atom or a fluororine atom, $R^3$ is a hydroxy group and R of the carboxyl group which may be csterified shown by —COOR of $R^4$ is an alkyl group which may have a substituent in the general formula [1], namely, those comprising as a structural unit a monomer unit shown by the following general formula [2]

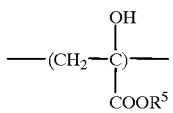

[2]

(wherein $R^5$ has the same meaning as above), and particularly preferable examples are those comprising as a structural unit a monomer unit of the general formula [1] wherein $R^1$ and $R^2$ are a hydrogen atom, $R^3$ is a hydroxy group and $R^5$ of the carboxyl group is a cyclic alkyl group of 7 to 12 carbon atoms which may have 1 to 2 hetero atoms such as N, S and O or a fluoroalkyl group. The preferable examples of the cyclic alkyl group of 7 to 12 carbon atoms which may have 1 to 2 hetero atoms are tricyclodecanyl group, dicyclopcntenyl group, norbomyl group, norboman epoxy group, adamantyl group, 2-methyl-2-adamantyl group and menthyl group.

The polymers comprising as a structural unit a monomer unit of the general formula [1] wherein the hydrophilic radical shown by $R^3$ is a lower carboxyalkyloxy group, a lower sulfoalkyloxy group, a hydroxy lower sulfoalkyloxy group, or a lower hydroxyalkyloxy group can be prepared by producing at first a polymer comprising as a structural unit a monomer unit of the general formula [1] wherein hydrophilic radical shown by $R^3$ is a hydroxy group and then introducing a lower carboxyalkyl group, a lower sulfoalkyl group, a hydroxy lower sulfoalkyl group, or a lower hydroxyalkyl group into the hydroxy group by treating the polymer after a conventional manner, or introducing the above a lower carboxyalkyl group, etc. into the hydroxy group of a monomer of the general formula [1a] wherein the hydrophilic radical shown by $R^3$ is a hydroxy group after a conventional manner and then polymerizing thus obtained monomer.

The polymers comprising as a structural unit a monomer units of the general formula [1] wherein the hydrophilic radical shown by $R^3$ is a carboxyl group, a sulfonic acid group or a lower hydroxyalkyl group can be prepared in a similar manner to the case where the hydrophilic radical shown $R^3$ is a hydroxy group.

The average molecular weight of the polymer of the present invention comprising as a structural unit a monomer unit of the general formula [1] is 1,000 to 500,000, preferably 2,000 to 200,000 in weight-average molecular weight obtained by GPC measurement method using polystyrene as a standard, and a molecular weight distribution (degree of dispersion) of the polymer is 1.0 to 3.0, preferably 1.0 to 2.5. Those molecular weight and degree of dispersion can be attained by controlling reaction conditions such as polymerization reaction time and temperature after a conventional manner.

In the following, the present invention is further explained with citation of synthesis examples, application examples and comparative examples, and the present invention is not limited, by any means, to those examples.

EXAMPLES

Synthesis Example 1
Synthesis of poly(2-hydroxyacrylic acid)

(1) 102.1 Grams(1 mole) of methyl pyruvate is dissolved in 204.2 g(2 moles) of acetic anhydride and 5.0 g(20 millimoles) of pyridinium p-toluenesulfonate is added thereto, followed by conducting a reaction at 100 to 110° C. for 7 hours with stirring and refluxing with stirring for 11 hours. After cooling, the reaction solution is poured into 5000 ml of water and the precipitated oily substance is extracted with ethyl ether. The extract layer is washed with water, dried over anhydrous magnesium sulfate, concentrated and distilled under reduced pressure to give 50.0 g of methyl 2-acetyloxyacrylate as colorless oil having bp. 65 to 68° C./11 mmHg.
$^1$HNMR δ ppm(CDCl$_3$):2.24(3H,s,C$\underline{H}_3$—CO), 3.81(3H, s,COOC$\underline{H}_3$), 5.48 and 6.05 (each 1H, each d, J=1.46, C$\underline{H}_2$=).

(2) 7.2 Grams (50 millimoles) of methyl 2-acetyloxyacrylate obtained in the above (1) is dissolved in 35 ml of toluene, and 10 ml of toluene solution of a catalytic amount of V-601 [Trade Name manufactured and sold by Wako Pure Chemical Industries, Ltd. Chemical Name: 2,2'-azobis(methyl 2-methylpropionate] is dropwise added thereto at 70° C. under nitrogen gas stream, followed by conducting a reaction at the same temperature for 7 hours with stirring. After cooling, the reaction solution is poured into 500 ml of methanol to cause precipitation. The precipitate is recovered by filtration, and dried under reduced pressure to give 5.9 g of poly(methyl 2-acetyloxyacrylate) as white powder. Molecular weight of the resulting polymer is measured by GPC method using polystyrene as a standard to find that the weight-average molecular weight is 48,500 and the molecular weight distribution(dispersion) is 2.23.
$^1$HNMR δ ppm(CDCl$_3$):2.05(3H,bs,C$\underline{H}_3$—COO), 2.70–3.60 (2H,bs,C$\underline{H}_2$), 3.75(3H,bs,C$\underline{H}_3$—OCO).

(3) 10.0 Grams of poly(methyl 2-acetyloxyacrylate) is suspended in 100 ml of methanol and 92.8 g of aqueous solution of 15% tetramethyl ammonium hydroxide is dropwide added thereto at room temperature, followed by stirring at room temperature for 1 hour and then a stirring at 45° C. for 10 minutes. The resultant is poured into 3000 ml of water to dissolve it therein. Then the reaction solution is passed through a column packed with 250 g of ion exchange resin (Amberlite IR-120B) and concentrated under reduced pressure to give 13.5 g of poly(2-hydroxyacrylic acid) as white powder. The weight-average molecular weight of the obtained polymer is 29,500 and the dispersion thereof is 2.22 (GPC method:polyethyleneglycol as a standard).
$^1$HNMR δ ppm(D$_2$O): 2.0–3.0(2H,bs,C$\underline{H}_2$).

Synthesis Example 2
Synthesis of poly(2-hydroxyacrylic acid/methacrylic acid)

(1) 8.6 Grams (60 millimoles) of methyl 2-acetyloxyacrylate obtained in Synthesis Example 1 (1) and 6.0 g (60 millimoles) of methyl methacrylate arc polymerized after a similar manner to Example 1 (2). After cooling, the reaction solution is poured into 500 ml of n-hexane to cause precipitation. The precipitate crystal is recovered by filtration and dried to give 9.8 g of poly(methyl 2-acetyloxyacrylate/methyl methacrylate) as white powder. The structural ratio of methyl 2-acetyloxyacrylate unit to methyl methacrylate unit is found as 1:1 by $^1$HNMR measurement. The weight-average molecular weight is found to be 11,840 and the dispersion is found to be 1.58 by GPC method using polystyrene as a standard.
$^1$HNMR δ ppm(CDCl$_3$):0.7–1.6(3H,bs,C$\underline{H}_3$), 1.7–3.5(7H, bs,C$\underline{H}_2$×2 and C$\underline{H}_3$—COO), 3.5–3.9(6H,bs,C$\underline{H}_3$OCO×2).

(2) Using 8.5 g of poly(methyl 2-acetyloxyacrylate/methyl methacrylate) obtained in the above (1), a similar reaction and after treatment to Example 1 (3) are conducted to give 5.0 g of poly(2-hydroxyacrylic acid/methacrylic acid) as white powdery crystal. The structural ratio of 2-hydroxyacrylic acid unit to methacrylic acid unit is found as 1:1 by $^1$HNMR measurement. The weight-average molecular weight is found to be 8,500 and the dispersion is found to be 1.57 (GPC method: polystyrene as a standard).
$^1$HNMR δ ppm(D$_2$O):0.8–1.2(3H,bs,C$\underline{H}_3$), 2.0–3.0(2H, bs,C$\underline{H}_2$×2).

Synthesis Example 3
Synthesis of poly(tricyclododecanyl 2-hydroxyacrylate/1-ethoxyethyl methacrylate)

(1) 0.5 Grams of phenothiazin is added to 144.2 g (2 moles) of ethyl vinyl ether and 86.1 g (1 mole) of methacrylic acid is dropwise added thereto at 10° C. or lower, followed by stirring at room temperature for 4 hours. 5.0 Grams of pyridinium p-toluenesulfonate is added to the resultant, followed by conducting a reaction with stirring at room temperature for 2 hours and allowing to stand for overnight at room temperature. 5 Grams of sodium bicarbonate and 5 g of sodium sulfate are added to the reaction solution, followed by stirring at room temperature for 1 hour. Insolubles are removed by filtration and concentration under reduced pressure is conducted, and the yellow oily residue is distilled under reduced pressure to give 134.0 g of 1-ethoxyethyl methacrylate as colorless oily fraction having bp. 43 to 45° C./7mmHg.
$^1$HNMR δ ppm(CDCl$_3$):1.22(3H,t,J=6.96 Hz,C$\underline{H}_3$—CH$_2$), 1.45(3H,d,J=5.13 Hz,CH$_3$—CH), 1.95(3H,s, C$\underline{H}_2$=C—CH$_3$), 3.50–3.79(2H,m,C$\underline{H}_3$—C$\underline{H}_2$—O—), 5.60 (1H,t,J=1.46 Hz, H—CH=C—CH$_3$), 6.00(1H,dd,J=5.13 Hz and 10.62 Hz,—O—C$\underline{H}$—O—), 6.16(1H,t,J=1.47 Hz, H—C$\underline{H}$=C—CH$_3$).

(2) 58.5 Grams (0.6 mole) of pyruvic acid, 30.5 g (0.2 mole) of 2-tricyclodecanol and 2.4 g of p-toluenesulfonic acid are dissolved in 800 ml of benzene, followed by refluxing with stirring for 4 hours. After cooling, the resultant is washed twice with aqueous solution saturated with sodium bicarbonate (each 200 ml) and once with NaCl aqueous solution (100 ml) and concentrated under reduced pressure to give 44.5 g of tricyclodecanyl pyruvate as pale yellow oil.

$^1$HNMR δ ppm(CDCl$_3$):0.92–2.35 (15H,m,hydrogen of cyclodecanyl ring), 2.46(3H,s,C$\underline{H}_3$—COO), 5.02–5.08(1H, m,—O—C$\underline{H}$—).

(3) 40.0 Grams (180 millimoles) of tricylodecanyl pyruvate obtained in the above (2) is dissolved in 90 ml of DMF and 22.0 g of triethylamine is dropwise added thereto at room temperature and 21.5 g (198 millimoles) of trimethyl sillyl chloride is further dropwise added at 10° C. or lower, followed by conducting a reaction with stirring at room temperature for 2 hours. 150 Milliliters of n-hexane and 150 ml of ethyl acetate are introduced into the resultant to dilute and the whole is poured in 2000 ml of cold water. The separated oily layer is recovered and dried over anhydrous magnesium sulfate and then the solvent is removed by distillation. 52 Grams of yellow oily residue is distilled under reduced pressure to give 45.5 g of tricyclodecanyl 2-trimethyl sillyloxy acrylate as colorless oily fraction having bp. 159 to 161° C./2mmHg.

$^1$HNMR δ ppm (CDCl$_3$):0.24(9H,s, C$\underline{H}_3$×3), 0.92–2.37 (15H,m, hydrogen of tricyclodecanyl ring), 4.95–5.00(1H, m,—O—C$\underline{H}$—), 4.87 and 5.49 (each 1H,each d,J=0.73 Hz, C$\underline{H}_2$=).

(4) Using 7.9 g (50 millimoles) of 1-ethoxyethyl methacrylate obtained in the above (1) and 14.7 g (50 millimoles) of tricyclodecanyl 2-trimethyl sillyloxy acrylate obtained in the above (3), a similar polymerization reaction to Synthesis Example 1 (2) is conducted in the presence of V-601 for 5 hours, and the reaction solution is treated similarly to give 10.8 g of poly(tricyclodecanyl 2-trimethyl sillyloxy acrylate/1-ethoxyethyl methacrylate) as white powder.

The structural ratio of 2-tricyclodecanyl 2-trimethyl sillyoxy acrylate unit to 1-ethoxyethyl methacrylate unit is found as 1:1 by $^1$HNMR measurement. The weight-average molecular weight is found to be 5,000 and the dispersion is found to be 1.39(GPC method: polystyrene as a standard).

$^1$HNMR δ ppm(CDCl$_3$):0.20(9H,s,CH$_3$×3), 0.50–2.70 (27H,m,hydrogen of tricyclodecanyl ring, C$\underline{H}_3$×3 and C $\underline{H}_2$×2), 3.40–4.00(2H,m,C$\underline{H}_2$—CH$_3$), 4.87(1H,s, C$\underline{H}$ of tricyclodecanyl ring), 5.72(1$\underline{H}$,bs,C$\underline{H}$ of acetal).

(5) 10.0 Grams of poly(tricyclodecanyl 2-trimethyl sillyloxy acrylate/1-ethoxyethyl methacrylate) is suspended in 45 g of tetra-n-butyl ammonium fluoride(1M aqueous solution), followed by stirring at room temperature for 2 hours. The resultant is extracted with ethyl acetate(200 ml×1) and the organic layer is washed with aqueous saturated ammonium chloride solution (150 ml×2), and washed with NaCl aqueous solution(100 ml) and dried with anhydrous magnesium sulfate. The drying agent is removed and the solvent is removed by distillation to give 7.6 g of residue of poly (2-tricyclodecanyl 2-hydroxyacrylate/1-ethoxyethyl methacrylate) as pale yellow powder. The weight-average molecular weight is 4,100 and the dispersion is 1.38(GPC method: polystyrene as a standard).

$^1$HNMR δ ppm(Acetone-d$_6$):0.77–2.81(27H,m, hydrogen of tricyclodecanyl ring, CH$_3$×3 and CH$_2$×2), 3.37–4.11(3H, m,CH$_2$—CH$_3$ and OH), 4.98(1H,bs,C$\underline{H}$ of tricyclodecanyl ring), 5.77(1H,bs, C$\underline{H}$ of acetal).

Synthesis Example 4
Synthesis of poly(adamantyl 2-hydroxyacrylate/1-ethoxyethyl methacrylate)

(1) 52.9 Grams (0.6 mole) of pyruvic acid and 76.3 g (0.5 mole) of 1-adamantanol are dissolved in 350 ml of benzene and 0.8 ml of concentrated sulfuric acid is dropwise added thereto, followed by refluxing with stirring for 4 hours and allowing to stand for overnight at room temperature. The resultant is washed twice with aqueous saturated sodium bicarbonate solution (each 250 ml) and once with saturated NaCl aqueous solution (200 ml) and the organic layer is dried over anhydrous magnesium sulfate. The solvent is removed by distillation to give 104.5 g of the residue of adamantyl pyruvate as white solid.

$^1$HNMR δ ppm(CDCl$_3$):1.69(6H,bs,hydrogen of adamantyl ring), 2.19(9H,bs,hydrogen of adamantyl ring), 2.41(3H, s,C$\underline{H}_3$—CO—).

(2) A similar reaction and after treatment to Synthesis Example 3 (3) is conducted with the use of 30.0 g (135 millimoles) of adamantyl pyruvate obtained in the above (1) to give 36.1 g of the residue of adamantyl 2-trimethyl sillyloxy acrylate as pale brown oil. $^1$HNMR δ ppm(CDCl$_3$) :0.19(9H,s,C$\underline{H}_3$×3), 1.65(6H,bs, hydrogen of adamantyl ring), 2.13(9$\underline{H}$,bs,hydrogen of adamantyl ring), 4.78 (1H,d, J=0.7 Hz, $\underline{H}$—CH=C—OTMS), 5.40(1H,d,J=0.7 Hz, H—C$\underline{H}$=C—OTMS).

(3) 14.8 Grams (50 millimoles) of adamantyl 2-trimethyl sillyloxy acrylate obtained in the above (2) and 7.9 g (50 millimoles) of 1-ethoxyethyl methacrylate obtained by a similar manner to Example 3 (1) are dissolved in 90 ml of 1,4-dioxane and 1,4-dioxane solution (30 ml) containing a catalytic amount of V-601 is dropwise added thereto at 75° C. under nitrogen gas stream, followed by conducting a polymerization reaction at the same temperature for 6 hours. After cooling, the resultant is poured into methanol(1200 ml) to cause precipitation. The precipitate is recovered by filtration and dried to give 6.8 g of poly(adamantyl 2-trimethyl sillyloxy acrylate/1-ethoxyethyl methacrylate) as white powdery crystal. The structural ratio of adamantyl 2-trimethyl sillyloxy acrylate unit to 1-ethoxyethyl methacrylate unit of the polymer is found as about 1:1 by $^1$HNMR measurement. The weight-average molecular weight is found to be 4,500 and the dispersion is found to be 1.47(GPC method: polystyrene as a standard).

$^1$HNMR δ ppm(CDCl$_3$):0.15(9H,bs,CH$_3$×3), 1.18(6H, bs,CH$_3$ and —OCH$_2$CH$_3$), 1.43(3H,bs,C$\underline{H}_3$—CH), 1.60–1.90 and 1.90–3.00 (30$\underline{H}$,hydrogen of adamantyl ring and CH$_2$×2), 3.40 (2H,m,—OC$\underline{H}_2$—CH$_3$), 5.73(1H,m, CH$_3$—C$\underline{H}$).

(4) A similar reaction and after-treatment to Synthesis Example 3 (5) is conducted with the use of 5.0 g of poly (adamantyl 2-trimethyl sillyloxy acrylate/1-ethoxyethyl methacrylate) obtained in the above (3) to give 3.7 g of poly(adamantyl 2-hydroxyacrylate/1-ethoxyethyl methacrylate) as pale yellow powdery crystal. The weight-average molecular weight is 3,600 and the dispersion is 1.45(GPC method: polystyrene as a standard).

$^1$HNMR δ ppm(CDCl$_3$):0.85–2.81(28H,m,hydrogen of adamantyl ring, CH$_3$×3 and CH$_2$×2), 3.36–4.08(3H,m,C $\underline{H}_2$—CH$_3$ and O$\underline{H}$), 5.75(1H,bs,C$\overline{H}_3$—C$\underline{H}$).

Synthesis Example 5

Synthesis of poly(2-hydroxyacrulic acid/2,2,2-trifluoroethyl 2-hydroxyacrylate)

1.32 Grams of poly(2-hydroxyacrylic acid) obtained in Synthesis Example 1 and 1.50 g(15mmole) of 2,2,2-trifluoroethanol are dissolved in 30 ml of N,N-dimethylformamide and 2.88 g(15mmole) of 1-ethyl-3-(3-dimethylaminopropyl)-carbodiimide hydrochloride is added thereto, followed by conducting a reaction at room temperature for 10 hours with stirring. After reaction, the reaction solution is poured into 200 ml of water, the precipitated oily substance obtained is washed with water and concentrated under reduced pressure to give 1.20 g of residue of poly(2-hydroxyacrylic acid/2,2,2-trifluoroethyl 2-hydroxyacrylate) as white powder.

The structural ratio of 2-hydroxyacrylic acid unit to 2,2,2-trifluoroethyl 2-hydroxyacrylate unit is found as 1:1 based on $^1$HNMR measurement. The weight-average molecular weight is found to be 29,500 and the dispersion is found to be 2.20(GPC method:polyethyleneglycol as standard).

Application Example 1

An aqueous solution for over-coating film is prepared from the following composition.
[Composition A]

| | |
|---|---|
| Poly (2-hydroxyacrylic acid) [polymer of Synthesis Example 1] | 3.5 g |
| Water | 96.5 g |

A pattern formation is conducted by using the above aqueous solution and a photoresist composition of the following composition B
[Composition B]

| | |
|---|---|
| Poly(p-tert-butoxycarbonyloxystyrene/p-hydroxystyrene) | 6.0 g |
| Triphenyl sulfonium triflate | 0.2 g |
| Propylene glycol monomethyl ether acetate | 24.0 g |

The photoresist composition of the above B is coated by a spin-coating method on silicone wafer and baked on a hot plate at 90° C. for 90 seconds to give photoresist film of 1 µm thick. Then aqueous solution of the above composition A for over-coating, in which the polymer of the present invention is dissolved, is coated by a spin-coating method on the photoresist film to give an over-coating film of 0.3 µm thick. The film is selectively exposed through a mask using KrF excimer laser stepper (NA 0.55). After 1 hour exposure, the film is baked on a hot plate at 105° C. for 90 seconds and developed with a developing solution(2.38% aqueous tetramethyl ammonium hydroxide solution) for 60 seconds by a puddle method to dissolve away only the exposed portion of the photoresist film and all of the over-coating film to give a positive tone rectangular pattern of 0.30 µm line and space with good profile.

Application Example 2

The following over-coating composition is prepared.

| | |
|---|---|
| Poly (2-hydroxyacrylic acid/methacrylic acid) [polymer of Synthesis Example 2] | 2.5 g |
| Perfluorotributylamide | 3.0 g |
| Water | 94.5 g |

Pattern formation is carried out in the same manner as described in Application Example 1 for using an over-coating composition prepared in the above and a photoresist composition abtained in Application Example 1. As a result, 0.30 µm line and space positive tone pattern can be formed as in Application Example 1 with good profile.

Comparative Example

A pattern is formed without using the aqueous solution using the polymer of the present invention, namely without using an over-coating film A photoresist composition comprising the Composition B of the Application Example 1 is coated by a spin-coating method on a silicone wafer and baked under the same conditions as the Application Example 1 to give a photoresist film of 1 µm thick. The film is selectively exposed through a mask using KrF excimer laser stepper. After 1 hour exposure, the film is baked and developed under the same conditions as the Application Example 1 to fail to form a pattern.

Application Example 3

The following over-coating composition is prepared.

| | |
|---|---|
| poly(2-hydroxyacrylic acid/2,2,2-trifluoroethyl 2-hydroxyacrylate) [polymer of Synthesis Example 5] | 3.0 g |
| Perfluoroalkyl nonionic surfactant | 1.0 g |
| Water | 96.0 g |

Pattern formation is carried out in the same manner as described in Application Example 1 for using an over-coating composition prepared in the above and a photoresist composition obtained in Application Example 1. As a result, 0.30 µm line and space positive tone pattern can be formed as in Application Example 1 with good profile.

Application Example 4

The following photoresist composition is prepared.

| | |
|---|---|
| Poly (tricyclodecanyl 2-hydroxyacrylate/1-ethoxyethyl methacrylate) [Polymer of Synthesis Example 3] | 6.0 g |
| Triphenylsulfonium triflate | 0.3 g |
| Propylene glycol monomethyl ether acetate | 23.7 g |

The photoresist composition of the above is coated by a spin-coating method on silicone wafer and baked at 90° C. for 90 seconds to give photoresist film of 1 µm thick. The film is selectively exposed through a mask using ArF excimer laser stepper (λ=193 nm;NA 0.55). After exposure, the film is baked at 90° C. for 90 seconds and developed with a developing solution (2.38% aqueous tetramethyl ammonium hydroxide solution) by a puddle method to give a positive tone pattern of 0.30 µm line and space Application Example 5

The following photoresist composition is prepared.

| | |
|---|---|
| Poly (adamantyl 2-hydroxyacrylate/1-ethoxyethyl methacrylate) [Polymer of Synthesis Example 4] | 6.0 g |
| Triphenylsulfonium triflate | 0.3 g |
| Propylene glycol monomethyl ether acetate | 23.7 g |

A pattern formation is conducted with the use of the above photoresist composition after the same manner as the Application Example 4 to give a positive tone pattern of 0.30 µm line and space.

As clear from the above explanation, the polymer of the present invention is excellent in its functions, and is remarkably useful as an over-coating film material and the main material for ArF excimer laser resist which is expected as a technology of the coming generation. Therefore, the present invention has high value for formation of fine pattern in semi-conductor industries, etc.

Further, the polymer of the present invention has high water-holding ability and high water-absorbing ability and thus can be applicable also to a water-absorbing polymer.

What is claimed is:

1. A homopolymer consisting essentially of a plurality of continuously repeating monomer units each represented by the formula (1)

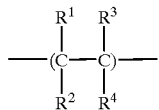
(1)

wherein $R^1$ and $R^2$ are, independently, a hydrogen atom or a halogen atom, $R^3$ is a hydrophilic radical and $R^4$ is a member selected from the group consisting of a cyano group, an unsubstituted or substituted amino carbonyl group, an unesterified or esterified carboxyl group, and wherein $R^1$, $R^2$, $R^3$ and $R^4$ are the same throughout all the repeating monomer units.

2. A copolymer consisting essentially of a plurality of continuously repeating monomer units each represented by the formula (1)

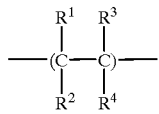
(1)

wherein $R^1$ and $R^2$ are, independently, a hydrogen atom or a halogen atom, $R^3$ is a hydrophilic radical and $R^4$ is a member selected from the group consisting of a cyano group, an unsubstituted or substituted amino carbonyl group, an unesterified or esterified carboxyl group, and wherein $R^1$, $R^2$, $R^3$ and $R^4$ are different throughout the repeating monomer units.

3. A copolymer consisting essentially of a plurality of repeating monomer units each represented by the formula (1)

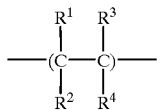
(1)

wherein $R^1$ and $R^2$ are, independently, a hydrogen atom or a halogen atom, $R^3$ is a hydrophilic radical and $R^4$ is a member selected from the group consisting of a cyano group, an unsubstituted or substituted amino carbonyl group, an unesterified or esterified carboxyl group, and wherein $R^1$, $R^2$, $R^3$ and $R^4$ in different repeating monomer units represented by formula (1) may be the same or different, and a plurality of repeating monomer units each represented by the formula (21)

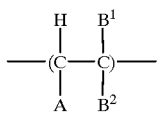
(21)

wherein A and $B^1$ are, independently, a hydrogen atom or a lower alkyl group having 1 to 5 carbon atoms, and $B^2$ is a member selected from the group consisting of a carboxyl group, a cyano group, an aminocarbonyl group, an unsubstituted alkyl group, an alkyl group having at least one substituent, an unsubstituted alkyl oxycarbonyl group, and an alkyl oxycarbonyl group having at least one substituent.

* * * * *